United States Patent
Saleem et al.

(10) Patent No.: US 8,081,191 B2
(45) Date of Patent: Dec. 20, 2011

(54) MULTIMEDIA PROCESSING IN PARALLEL MULTI-CORE COMPUTATION ARCHITECTURES

(75) Inventors: Adnan Saleem, Surrey (CA); Alvin Chubbs, Vancouver (CA); Neil Gunn, Coquitlam (CA); James Davidson, Surrey (CA); Serguei Smirnov, Coquitlam (CA)

(73) Assignee: RadiSys Canada ULC, Burnaby, BC (CA)

( * ) Notice: Subject to any disclaimer, the term of this patent is extended or adjusted under 35 U.S.C. 154(b) by 578 days.

(21) Appl. No.: 12/237,840

(22) Filed: Sep. 25, 2008

(65) Prior Publication Data

US 2009/0083516 A1  Mar. 26, 2009

Related U.S. Application Data

(63) Continuation-in-part of application No. PCT/CA2007/000494, filed on Mar. 28, 2007.

(60) Provisional application No. 60/743,959, filed on Mar. 30, 2006, provisional application No. 60/743,848, filed on Mar. 28, 2006.

(51) Int. Cl.
*G06F 15/16* (2006.01)
*G06F 15/80* (2006.01)

(52) U.S. Cl. ............. 345/505; 345/502; 712/13; 712/15

(58) Field of Classification Search ........................ None
See application file for complete search history.

(56) References Cited

U.S. PATENT DOCUMENTS

| 5,576,945 | A | | 11/1996 | McCline et al. |
| 5,748,468 | A | | 5/1998 | Notenboom et al. |
| 5,799,149 | A | | 8/1998 | Brenner et al. |
| 5,974,439 | A | * | 10/1999 | Bollella ........................ 718/104 |
| 6,044,408 | A | * | 3/2000 | Engstrom et al. ............. 719/328 |
| 6,573,905 | B1 | * | 6/2003 | MacInnis et al. .............. 345/629 |
| 7,659,900 | B2 | * | 2/2010 | MacInnis et al. .............. 345/505 |
| 7,671,862 | B1 | * | 3/2010 | Patel et al. .................... 345/501 |

FOREIGN PATENT DOCUMENTS

CN 1582581 2/2005
WO 03039160 A1 5/2003

* cited by examiner

*Primary Examiner* — Corey S Faherty
(74) *Attorney, Agent, or Firm* — Aaron D. Barker; Stoel Rives LLP

(57) ABSTRACT

In a media server for processing data packets, media server functions are implemented by a plurality of modules categorized by real-time response requirements.

24 Claims, 3 Drawing Sheets

MULTIMEDIA PROCESSING IN PARALLEL MULTI-CORE COMPUTATION ARCHITECTURES

CROSS REFERENCE TO RELATED APPLICATIONS

This application is a continuation-in-part of co-pending International Application No. PCT/CA07/000494 filed Mar. 28, 2007 and claims the benefit under 35 USC 119(e) of prior U.S. provisional application No. 60/743,959, filed Mar. 30, 2006, the contents of which are herein incorporated by reference.

FIELD OF THE INVENTION

This invention relates to the field of multimedia communications, and in particular to a media server, where the media server is intended for use with VOIP telephony networks, packet cable networks, PSTN telephony networks, wireless telephony networks, and all combinations thereof.

BACKGROUND OF THE INVENTION

Media servers are employed in telephony networks, and perform a variety of basic and enhanced services which include conferencing, audio and video interactive voice response (IVR), transcoding, audio and video announcements, and other advanced speech services. They may also be employed in networks which provide video conferencing services, as well as typical data exchange services of the sort which occurs over the Internet, over virtual private networks, within wide area networks and local area networks, and the like. In all cases, data exchange and processing performed by the media server is based on packet processing with fixed maximum processing time requirements.

Advances in hardware architectures, enabling multi-core and multi-processor computation, presents new challenges for software architectures and parallel processing algorithms. Incremental additions of parallel processing cores do not necessarily translate into equivalent linear increases in the amount of processing capacity. A given algorithm or processing task typically consists of some sub-sections which may be executed in parallel while other sub-sections must be executed in sequence. The relative proportion of serial and parallel execution sections governs the aggregate processing capacity of a system consisting of multiple parallel processing units. The relationship between the number of parallel processing units (N), proportion of parallelizable instructions (P), and the maximum speedup of the system is defined by Amdahl's Law.

[Amdahl's Law]

$$\text{MAXIMUM SPEEDUP} \le S + P/(S + P/N) \text{ or}$$

$$\text{MAXIMUM SPEEDUP} \le \frac{1}{S + (1-S)/N}.$$

$S$ = percentage of serial execution code $P$ = percentage of parallel execution code $N$ = Number of Processors $1 = S + P$ Regardless of the total number of available processors (N), if all code sections require serial execution (S=1) then maximum speedup factor remains at 1. Theoretically, if all processing could be parallelized (P=1), then the maximum speedup is N, equivalent to the number of parallel processors available.

Amdahl's Law describes the general rules for taking advantage of multiple parallel processing cores for applications requiring large scale numerical data processing. However, the complex issues of real-time processing, deterministic response times, and load balancing across multiple cores are not addressed. These issues are essential for telecommunication applications.

SUMMARY OF THE INVENTION

Embodiments of the invention enable real-time sensitive media processing functions to be completed with deterministic response times, as required, utilizing multi-core and multi-processor hardware architectures.

Accordingly a first aspect of the invention provides a media server for processing data packets, comprising a plurality of processing cores for implementing media server functions, wherein said processing cores implement said media functions in modules categorized by real-time response requirements.

A second aspect of the invention provides a method of operating a media server for processing data packets, comprising providing modules categorized by real-time response requirements for performing said media functions; and implementing modules on a plurality of processing cores in accordance with said real-time response requirements.

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENTS

Figure 1:
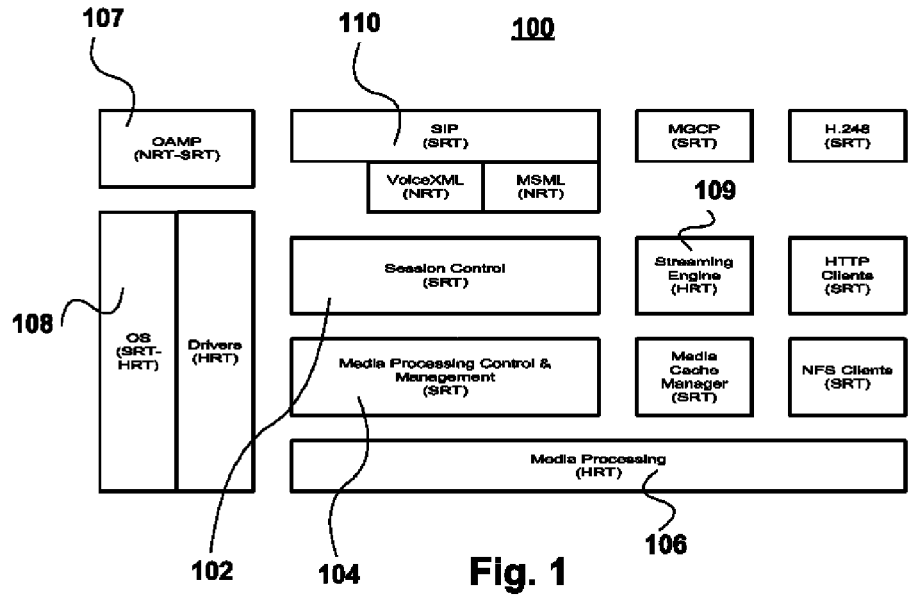
FIG. 1 is a block diagram of media server real-time processing modules.

As illustrated in FIG. 1, media server functions are comprised of multiple modules and layers 100, each having distinctly different processing requirements. The Media processing requests from network entities to the media server originate from control protocols, namely SIP, MGCP, Megaco (H.248), VoiceXML, and MSML.

The Session Control layer 102 manages the control protocol requests by allocating and initiating media processing performed by other modules in the media server. The media processing layer 106 performs packet processing in compliance with the RTP protocol, for all inbound and outbound media packets. Additionally, a media streaming module 109 provides functions for fetching and submitting media content from/to internal and external media storage systems, such as HTTP and NFS.

The underlying Operating System and system services, hardware device drivers, and operational configuration and management functions, including Operations, Administration, Maintenance and Processing (OAMP) module 107 provide services directly or indirectly, to all other modules within the media server.

The various modules 100 of the media server have distinctly different processing requirements from a perspective of real-time response. Although each module requires a deterministic response time, the real-time response requirements vary and are categorized into hard real-time (HRT), soft real-time (SRT), and near real-time (NRT) as shown in FIG. 1. In this context, NRT is the least real-time constraining of the three classifications (hard realtime, soft realtime, and near realtime). NRT could relate to a non real time operation, but it could also relate to an operation where there is some dependence on its timely completion.

Generally, in computing terms, a system is said to be real-time if the correctness of an operation depends not only upon the logical correctness of the operation but also upon the time at which it is performed. In a hard or immediate real-time system, the completion of an operation after its deadline is considered useless—ultimately, this may lead to a critical failure of the complete system. A soft real-time system on the other hand will tolerate such lateness, and may respond with decreased service quality (e.g., dropping frames while displaying a video). Hard real-time systems are typically found interacting at a low level with physical hardware, in embedded systems.

Hard real-time systems are used when it is imperative that an event is reacted to within a strict deadline. Usually such strong guarantees are required of systems for which not reacting in a certain window of time would cause great loss in some manner, such as physically damaging the surroundings or threatening human lives; although the strict definition is simply that missing the deadline constitutes complete failure of the system. In the context of multitasking systems the scheduling policy is normally priority driven pre-emptive schedulers.

Soft real-time systems are typically those used where there is some issue of concurrent access and the need to keep a number of connected systems up to date with changing situations. These can typically operate to a latency of seconds.

Three different multimedia processing embodiments utilizing multi-core hardware platforms are disclosed herein.

Asymmetric Multimedia Processing

Figure 2:
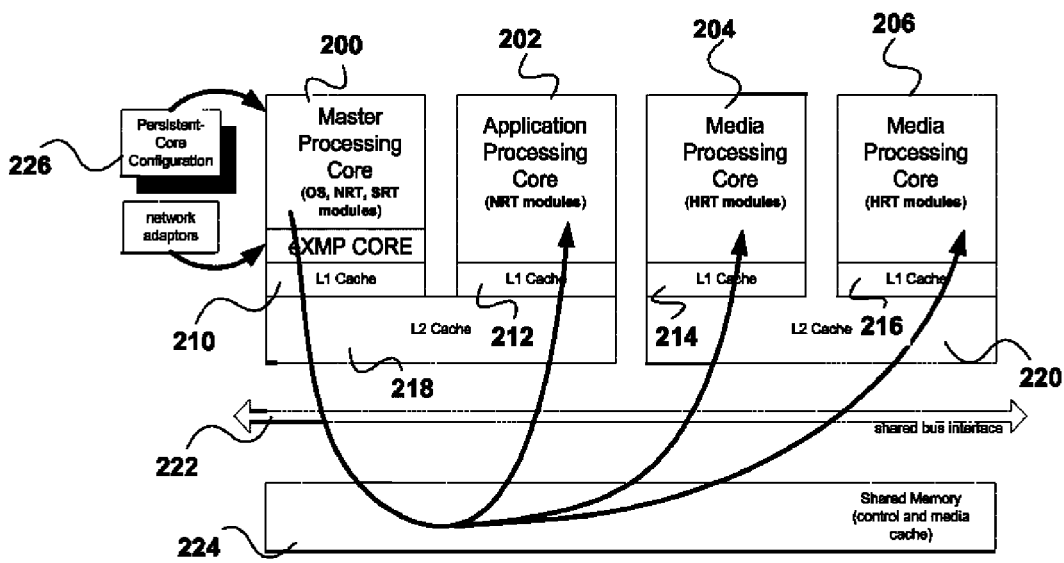
FIG. 2 is a block diagram of an asymmetric multi-core media server.

FIG. 2 shows an example of a media server based on a four processing core system. This embodiment has a dual-core dual-processor media server.

The asymmetric multimedia processing model for the media server, as shown in FIG. 2, has four processing core modules 200, 202, 204, 206. The HRT modules 204, 206 are separate from the SRT and NRT modules 200, 202 for execution on independent processing cores. The number of cores dedicated to HRT modules and to SRT and NRT modules is a media server configurable option.

One of the set of processing cores 200 is identified as the master processing core and this provides the operating services, configuration control, and loading of the other available cores within the media server. The Master core also contains the eXMP Core Module 200, which controls system resource allocation and scheduling across all available processing cores. Each module is associated with its own L1 cache 210, 212, 214, 216, and pairs of modules are associated with respective L2 caches 218, 220.

The communication of control and media packets between the cores is based on a shared memory scheme or other IP based inter-core communication interfaces. In this example, the modules communicate over a shared bus interface 222 and have a shared memory 224.

The number of available processing cores and media servers consisting of multiple processing cores and adjunct DSP processors are managed by the eXMP Core Module 200. The allocation of cores or DSPs is based on pre-set system configuration and cannot be altered during run-time. However, a re-configuration allows the number of cores dedicated for HRT modules and the number of cores dedicated for SRT and NRT modules to be changed.

The allocation of available cores for HRT, SRT, and NRT functions can be modified using the OAMP module 107 of the media server shown in FIG. 1. Updates to the allocation scheme are stored in persistent storage 226. Upon media server start-up, the pre-configured processing modules are instantiated on the available cores as identified by the configuration data.

The eXMP Core module 200 provides the following services to the multi-core media server.
1. Identifies the Master Processing Core at system start-up.
2. Loads the available cores with the appropriate media processing functions according to the assigned core allocation scheme from the persistent configuration data.
3. Provides a control and media communication interface between the available cores using shared memory or IP based interfaces.
4. Provides a direct and efficient network packet flow from the network adaptors to the appropriate media processing core.
5. Provides a layer above the OS and services such that the HRT processing cores are not unnecessarily interrupted, hence effectively separating the OS, NRT, and SRT functions from the HRT cores.
6. Manages the allocation of HRT media processing resources across the available HRT cores to provide load balancing.

Some of the Media Processing objects constrained to the HRT assigned cores are:
1. RTP Input
2. RTP Output
3. Audio and Video Decoder
4. Audio and Video Encoder
5. Audio Mixer
6. Video scaling and screen splitting
7. Video Text and Image Overlays
8. Video split-screen borders and background colors and images
9. Audio Gain and Automatic Gain Control
10. In-band and Out-of-band tone detection including DTMF
11. In-band and Out-of-band tone generation including DTMF
12. Voice Activity Detector
13. Silence suppression
14. Echo cancellation
15. Video and audio announcement streaming
16. Hot-Word voice recognition
17. Voice Activated Video Switching
18. Audio and Video Recording Each of the above media processing objects and variations of the objects has a quantifiable instruction count and a specific real-time response requirement. These processing objects remain idle until invoked, at which point the processing starts with a fixed maximum amount of latency and a fixed maximum amount of processing until completion. The processing requirement of these objects is unaffected by any other concurrent operation performed by the media server as only the media processing objects run on the cores assigned to HRT tasks.

The Session Control module and Media Processing Control and Management module collectively break higher level protocol service requests into a set of time-sequenced tasks for media processing objects.

These higher level protocol service requests include:
19. Create RTP stream to an end terminal
20. Play audio or video announcements
21. Start/stop audio or video recordings
22. Detect DTMF digits
23. Create a conference
24. Join users to a conference
25. Apply gain or DTMF clamping The Media Processing Control and Management software models the processing time used by each media processing object for each assigned task. In this model, each DSP core is assigned a specific number of available CPU units. Each task required by a media processing object uses up a specific number of units.

The Media Processing Control and Management software uses the modeled load to determine which DSP core to assign new services to.

The Media Processing Control and Management software rejects requests for additional services when there are insufficient CPU units available to fulfill the request.

The Media Processing Control and Management software receives continuous feedback on the current number of CPU units used by each core. This feedback is used to dynamically adjust the level at which incoming requests are rejected.

The media processing objects use only a minimal set of OS services so that the modeled CPU load is not affected by OS service processing time.

The media processing software is constructed as a single OS thread so that the modeled CPU load is not affected by OS scheduler processing time.

Interrupt processing mechanisms, as supported by the general purpose Operating Systems, can interact or interfere with real-time media processing if the interrupt processing time introduces latencies and CPU loading preventing hard-real time tasks from completing within a fixed required amount of time. In order avoid this unacceptable impact to HRT and SRT processes, the interrupt processing mechanisms are dedicated to single or multiple CPU cores which are not allocated for real-time processing.

Figure 5:
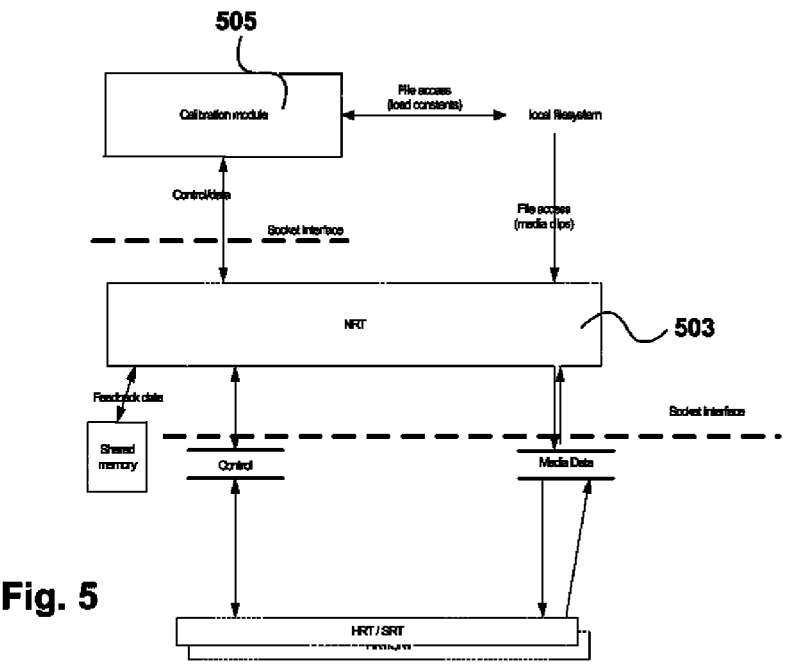
FIG. 5 is a block diagram of part of the multi-core media servers showing the calibration module.
Figure 6:
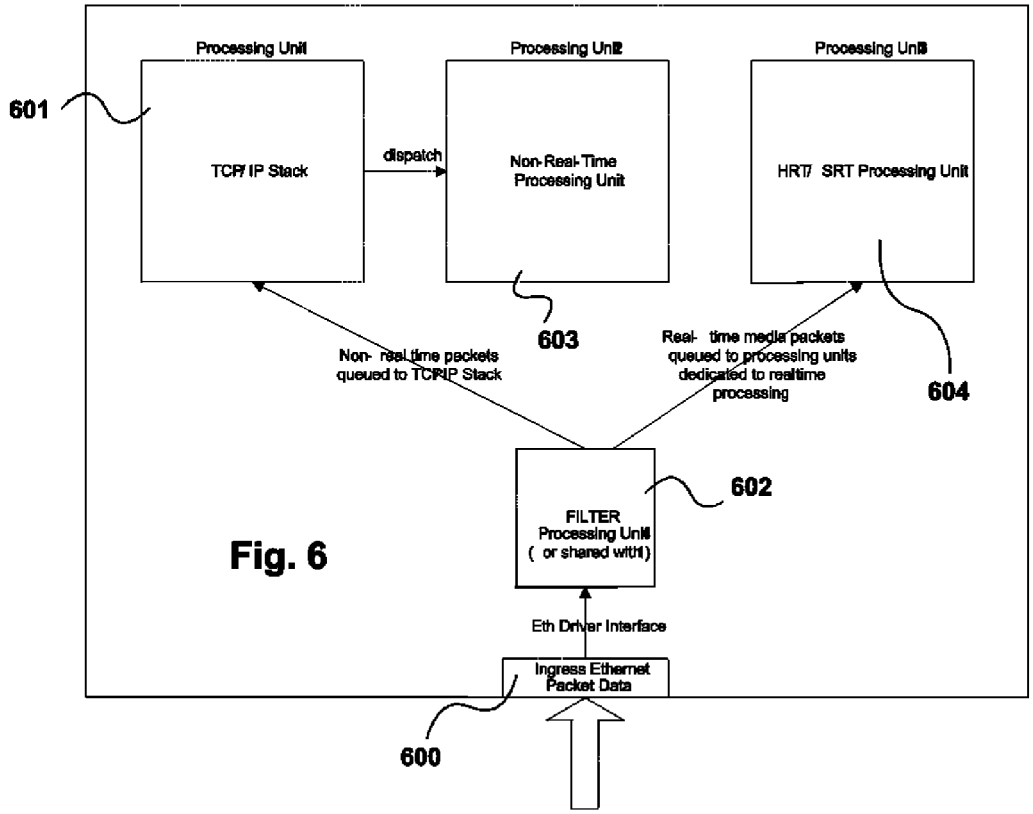
FIG. 6 is a block diagram showing the real-time data filtering mechanism.

Communication paths carrying real-time media are optimized by application of filtering and routing media data to the media processing unit, bypassing processing units allocated for non real-time media processing as show in FIGS. 5 and 6.

The real-time data filtering and forwarding is applied at the ingress network interfaces 600 to enable media data packets to bypass the general purpose TCP/IP stack 601, which otherwise would introduce unnecessary and unacceptable delays and thus reduced quality expected from of real-time media processing. The filtering mechanism 602 is based on destination IP media IP address, port number, and protocol types, as illustrated in FIG. 6. The TCP IP stack 601 communicates with non-real-time processing unit 603. Filter 602 can send data packets direct to HRT/SRT processing unit 604.

Feedback alone being insufficient for proper control of the CPU load on a Media Processing core, run-time model of current processing load on each core is maintained using the information about the number of conventional CPU units required by each media processing object. This information is collected by the Media Processing Calibration module 505 communicating with NRT unit 503 (FIG. 5) and is made available prior to Media Server being put in service state.

The calibration module 505 is a separate module from the rest of the system. It is used prior to release of the product to measure the real-time response of the system (under various conditions and models as described) and the values determined from this process are then used in the released product by the SRT and HRT modules (mainly the HRT). The media processing calibration module output is preferably obtained in an offline simulation environment by creating specific static configurations of media processing objects, providing media input and using feedback data from media processing cores to estimate and factorize the information on the CPU load incurred on a CPI core.

The Media Processing load model is a set of rules for calculating the number of available CPU units as well as any other limited countable resources available to and dependent on a set of Media Processing cores. Run-time model of current processing load on a Media Processing core is a result of applying these rules to the information about currently allocated configuration of media processing objects.

Media Processing Calibration module 505 focuses on the CPU aspect of the Media Processing load model. The output of Media Processing Calibration module is a collection of numbers which are used in defining the rules for calculation of the estimate for the number of CPU units required for a media processing object. These numbers are expected to be different on different Media Server platforms. Identical platforms, meaning that all hardware and software parameters of the systems are equivalent, are expected to yield the same set of numbers from the Media Processing Calibration process. At start-up Media Server system identifies the platform and chooses the associated Media Processing model reading the calibration numbers from a file specific to the platform Media Processing Calibration module 505 simulates a Media Server system under load by creating specific static configurations of media processing objects and providing media input. Media Processing Calibration module uses feedback information from Media Processing cores to estimate and factorize the information about the CPU load incurred by a static media processing objects configuration to obtain numbers that constitute the model for calculation of the CPU load incurred by a specific media processing object type.

If the estimating media processing object load formula is defined as quadratic $L=Ax^2+Bx+C$, $A>0$, the following method is used to obtain the load constants. A set of experimental points $S=\{p_i=(x_i,y_i)\}$ is obtained, where $0<=i<=N$, $x_i<x_{i+1}$, $y_0<y_N$. $L_1=A_1x^2+B_1x+C_1$ is built, such that $L_1(x_N)=y_N$, $L_1(x_0)=y_0$, $d/dx(L_1(x_0))=0$. If there is $k<N$ such that $y_k>L_1(x_k)$, then $C_1$ is adjusted by $(y_k-L_1(x_k))$. If there is no such k, then $L_1$ is declared to be the estimating function and its coefficients are recorded as the load constants.

If the estimating media processing object load formula is defined as linear $L=Ax+B$, $A>0$ the following method is used to obtain the load constants. A set of experimental points $S=\{pi=(x_i,y_i)\}$ is obtained, where $0<=i<=N$, $x_i<x_{i+1}$, $y_0<y_N$. $L_1=A_1x+B_1$ is built, such that $L_1(x_N)=y_N$, $L_1(x_0)=y_0$. If there is $k<N$ such that $y_k>L_1(x_k)$, then $B_1$ is adjusted by $(y_k-L_1(x_k))$. If there is no such k, then $L_1$ is declared to be the estimating function and its coefficients are recorded as the load constants.

If the estimating media processing object load formula is defined as a n-dimensional hyper plane, the following method is used to obtain the load constants. The equation that defines n-dimensional hyper-plane is as follows: $\Sigma A_i X_i + C = 0$ where $0 \leq i \leq n-1$. (A). Or equivalent if C is not equal to zero: $\Sigma B_i X_i + 1 = 0$ where $B_i = A_i/C$, $0 \leq i \leq n-1$. (A1) We declare that the experimental point (B) belongs to the estimating hyper-plane (A1): $\Sigma B_i P_{k,i+1} = 0$ where $0 \leq i \leq n-1$. (C). n points are needed to define a n-dimensional hyper-plane. Writing down (C) for each experimental point gives a system of linear equations, which can be represented in matrix form as follows: $M \cdot y = u$, where $M = (P_{ij})$, $y = [B_i]^t$, $u = [-1, \ldots, -1]^t$, $0 \leq i,j \leq n$. (D) This system is solved using the Cramer's rule, which states that $y_i = \Delta_i/\Delta$, where $\Delta = \det(M)$, $\Delta_i = \det(M_i)$, $M_i$ is M with column i replaced by vector u. (E).

The load modeled calibration values, determined as described in sections above, are used during normal system operation to limit the in-take of inbound requests (call volume) in order to prevent system overload conditions which can affect the real-time performance of the system and degrade end user perceptible quality of service. Upon reaching the thresholds set by the calibrated values, additional ingress user calls are throttled back via the signaling interface.

Dynamic Asymmetric Multimedia Processing

Figure 3:
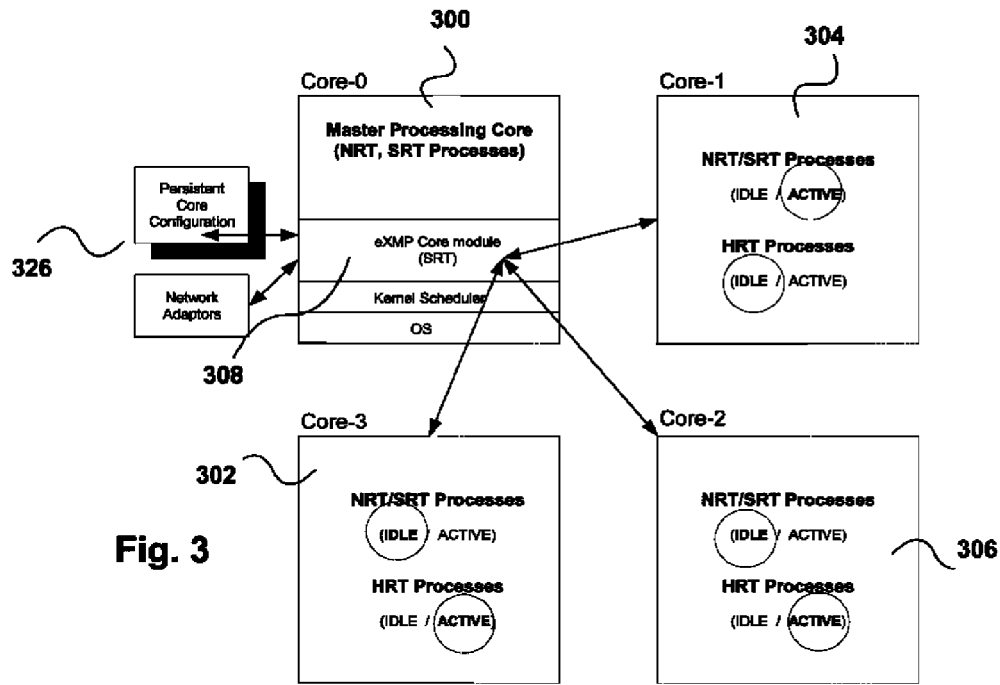
FIG. 3 is a block diagram of a dynamic asymmetric multi-core media server.

The dynamically asymmetric multimedia processing design model, illustrated in FIG. 3, separates the HRT modules 302, 306 from the SRT and NRT modules 300, 304, s in the case of asymmetric processing model described with reference to FIG. 2. However, this embodiment enables the dynamic detection of system utilization and allocation of media processing cores accordingly. Mixing of HRT functions with NRT or SRT functions is not permitted in this embodiment in order to ensure that deterministic real-time responses required by the HRT functions can be guaranteed.

In this embodiment, the eXMP Core module 308 monitors the amount of core processor utilization and load levels during run-time. Based on this information, the eXMP Core module 308 can adjust the allocation or reservation of cores for HRT, SRT, and NRT functions. As with the previous embodiment, the Master Processor Core 300 remains static, while other available core functions may be dynamically adjusted.

A dual-core system is not possible in this embodiment because the mixing of the HRT modules with the NRT and SRT is not possible. However, for a media server which consists of four or more cores, the dynamic load balancing of HRT, SRT, and NRT modules is accomplished by the eXMP Core module 308, without the need for system reconfiguration.

During system start-up and initialization, the eXMP Core module performs core allocation according to the persistent configuration data stored in memory 326.

The frequency of adjustments to core process assignment takes into account the system cost in terms of processing latency. If such a penalty does not allow a re-adjustment, then the core process allocation scheme is not adjusted. This mechanism prevents thrashing, which can lead to lower overall system performance.

In order to instantiate a functional process on a given core as quickly as possible, the allowable processes are invoked on the core during system start-up. Each such process is set in the idle state until allocated and assigned by the eXMP Core module, at which time it is available for receiving events to perform the required actions.

A run-time model of current processing load on each core is managed by the eXMP Core module 308. Each core manages and updates its performance utilization information within a shareable section of memory. The eXMP Core module 308 periodically reads this information to determine if any adjustments are required to the current process assignments to the available cores. The scheduling and assignment ensures that NRT and SRT functions are prevented from execution on a given core concurrently with HRT functions.

The eXMP Core module provides the following services to the media server:
1. Initiate system start-up core allocation based on media server configuration, as to assignment of HRT, SRT, and NRT functions.
2. Loads each processing core with allowable HRT, SRT, and NRT functions and sets the associated states to Idle and ready state. This mechanism prevents un-necessary process setup and switching times when re-assignment is required. At time of re-assignment, the associated process state is changed from Idle to Active or vice-versa.
3. Implements algorithms based on several factors which model resource utilization of each processing core. The factors contributing to processor core resource utilization are amount of CPU consumption, length of queued requests, and the average latency or response times.
4. Based on the core processor utilization model, re-adjusts or re-assigns a processing core for HRT or non-HRT functions.
5. Implements mechanisms to prevent thrashing a core processor from toggling between HRT functions and non-HRT functions.

Modular Symmetric Multimedia Processing

Figure 4:
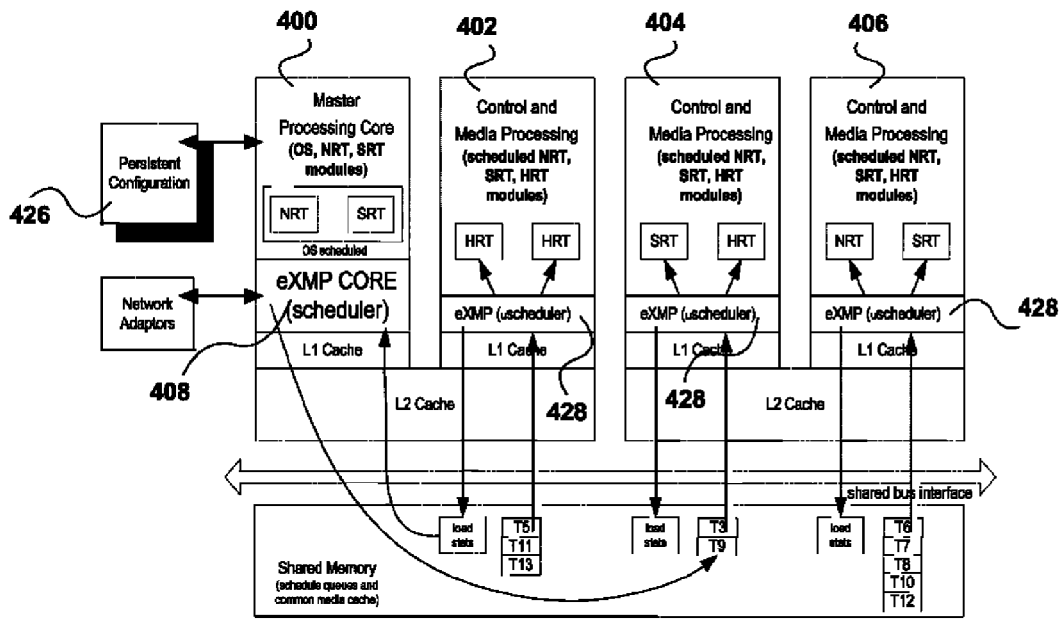
FIG. 4 is a block diagram of a module symmetric multi-core media server.

In a third embodiment, shown in FIG. 4, based on a modular symmetric multimedia processing design, the execution of HRT, SRT, and NRT modules concurrently on the same core or sets of cores in a multi-core media server is permitted. Symmetric processing in this embodiments is intentionally designed for coarse-grained parallel execution.

The HRT modules 404, 406 along with SRT and NRT modules 400, 402 are scheduled for execution on the same processing core, based on the current load level of the core, resource utilization level of the core, and the processing real-time deadline associated with the task to be scheduled.

Measurements of load levels on the processing cores are managed by each core and written to a common shareable memory location. The Master Processing Core 400 executes a load scheduling algorithm as part of the eXMP Core module 408. The eXMP Core scheduler 408 prevents the operating system scheduler from scheduling tasks directly to the cores, which may lead to un-deterministic behavior.

An execution priority scheme allows the eXMP Core module 408, which includes a core scheduler, to determine the target core for execution as well as the priority order for processing within the core. This mechanism allows a given core to process queued requests in the order of processing priority based on the real-time requirements of the request.

The scheduling of worker threads on the available cores is under the control of the eXMP Core scheduler 408; however, threads on the Main Processor Core 400 are managed and processed by the Operating System scheduler.

The eXMP Core scheduler 408 provides scheduling of media processing tasks (HRT) without much involvement from the standard operating system services and TCP/IP stack. The media data packets are assembled and scheduled for processing by the core as determined by the eXMP Core scheduler. Media and control data copying is minimized by the use of shared memory regions which are accessible by the Main Processing Core 400 as well as the individual core which is scheduled for processing the content of the queued requests. The resource utilization measurements used by the eXMP Core scheduler 408 are specific to media processing objects with quantifiable and deterministic response time requirements.

The eXMP uScheduler 428 manages the scheduling requirements on a specific core. It enables concurrent execution of threads on the same processing core, under strict real-time controls. A standard operating system typically does not provide hard real-time controls required by media processing functions. The eXMP uScheduler 428 provides higher priority and service time for HRT module request over any other currently executing NRT and SRT modules on the same core.

Load Balancing

The eXMP cores 428 monitor and measure the CPU utilization, queue lengths, and response times periodically. The measured results are periodically updated in a common shared memory area, which is made accessible to the eXMP Core module 408 on the Master Processing Core 400. The eXMP core 408 schedules new requests for the individual cores based on the processing measurements. The requests objects are queued for processing by the individual cores in a shared memory region. An algorithm for load balancing, within the real-time response constraints, is implemented and managed within the eXMP Core module providing a centralized load balancing mechanism.

Cache Coherency

In order to avoid or minimize cache incoherency, the HRT, SRT, and NRT modules are designed with minimum contention for same regions of memory data structures. Data access locking via spin locks and other mutual exclusion mechanisms are minimized in the core processing modules as well as in the eXMP Core scheduling modules.

Redundancy

The eXMP Core includes a heart-beat protocol which allows detection of core failures due to hardware or software fatal errors. Since this design implements a shared memory mechanism, the transactional and operational states of modules executing on core are preserved over a core failure. The eXMP Core module 408 utilizes this mechanism in switching the processing from the failed core to a redundant core by re-mapping the shared memory, containing the relevant state information, to be utilized by the redundant core.

The invention claimed is:

1. A media server for processing data packets, comprising:
a plurality of parallel processing cores for implementing media server functions,
wherein said plurality of parallel processing cores implement said media server functions in three or more different types of modules categorized by real-time response requirements,
wherein subsets of said plurality of parallel processing cores are respectively dedicated to said three or more different types of modules, and
wherein a number of processing cores in each of said subsets is dynamically configurable based at least in part on an amount of core processor utilization and load levels during runtime.

2. The media server as claimed in claim 1, wherein said three or more different types of modules are based on consequences of missing corresponding processing deadlines, the three or more different types of modules comprising:

hard real-time (HRT) modules for processing HRT functions, wherein missing a processing deadline when executing the HRT functions results in a failure of the media server;
soft real-time (SRT) modules for processing SRT functions, wherein missing a processing deadline when executing the SRT functions results in an unacceptable degraded quality of service; and
near real-time (NRT) modules for processing NRT functions, wherein missing a processing deadline when executing the NRT functions results in a tolerable quality of service.

3. The media server as claimed in claim 2, wherein one of said plurality of parallel processing cores serves as a master core for providing operating services, configuration control, and loading of available cores within the media server.

4. The media server as claimed in claim 3, wherein said master core includes a control core module for allocating and scheduling system resources across said plurality of parallel processing cores.

5. The media server as claimed in claim 2, wherein the HRT modules are separated from the SRT and NRT modules for independent processing.

6. The media server as claimed in claim 4, wherein the control core module is configured to monitor the amount of core processor utilization and load levels during runtime to dynamically adjust the allocation of processing cores for said HRT, SRT, and NRT functions.

7. The media server as claimed in claim 3, wherein said master core is configured to schedule said HRT, SRT and NRT modules for execution concurrently on the same core or sets of cores and implement an execution priority scheme to determine the target core for execution.

8. The media server as claimed in claim 1, further comprising:
a media processing calibration module for generating a model for calculating a load required by specific media processing object types, the media processing calibration module generating the model in an offline simulation environment based on specific static configurations of the media processing object types; and
a control core module for allocating the media server functions across the subsets of said plurality of parallel processing cores based on, in addition to being based on the three or more different types of modules categorized by the real-time response requirements, the generated model for corresponding media processing object types.

9. A method of operating a media server for processing data packets, comprising:
providing three or more different types of modules categorized by real-time response requirements for performing media server functions;
dedicating subsets of a plurality of parallel processing cores to said three or more different types of modules;
dynamically configuring a number of processing cores in each of said subsets based at least in part on an amount of core processor utilization and load levels during runtime; and
implementing the three or more different types of modules on the respective subsets of the plurality of parallel processing cores in accordance with said real-time response requirements.

10. The method claimed in claim 9, wherein said three or more different types of modules are based on consequences of missing corresponding processing deadlines, the three or more different types of modules comprising:

hard real-time (HRT) modules for processing HRT functions, wherein missing a processing deadline when executing the HRT functions results in a failure of the media server;

soft real-time (SRT) modules for processing SRT functions, wherein missing a processing deadline when executing the SRT functions results in an unacceptable degraded quality of service; and near real-time (NRT) modules for processing NRT functions, wherein missing a processing deadline when executing the NRT functions results in a tolerable quality of service.

11. The method as claimed in claim 10, wherein one of said plurality of parallel processing cores serves as a master core for providing operating services, configuration control, and loading of available cores within the media server.

12. The method as claimed in claim 11, wherein a control core module in said master core allocates and schedules system resources across said plurality of parallel processing cores.

13. The method as claimed in claim 10, wherein the HRT modules are separated from the SRT and NRT modules for independent processing.

14. The method as claimed in claim 13, wherein the control core module maintains a run-time model of core processor utilization and load levels to dynamically adjust the allocation of processing cores for said HRT, SRT, and NRT functions.

15. The method as claimed in claim 11, wherein said master core schedules said HRT, SRT and NRT modules for execution concurrently on the same core or sets of cores.

16. The method as claimed in claim 15, wherein said master core module is configured to implement an execution priority scheme to determine the target core for execution.

17. The method as claimed in claim 14, wherein a media processing calibration module provides data needed to estimate a number of available central processing units (CPUs) based on a current resource configuration.

18. The method as claimed in claim 17, wherein the media processing calibration module output is obtained in an offline simulation environment by, for specific static configurations of media processing object types, providing media input and using feedback data from media processing cores to estimate and factorize information on a CPU load incurred on a CPU core.

19. The method as claimed in claim 18, wherein the estimation functions are deemed to be either of a k-degree univariate polynomial or a n-dimensional hyper plane conjunction class.

20. The method as claimed in claim 19, wherein a k-degree univariate polynomial is built on an interval using interpolation of a set of no less than k+1 data points such that the interpolation error is minimal and the values at any node are less than or equal to the value of the polynomial on the same node.

21. The method as claimed in claim 20, wherein a n-dimensional hyper plane is built on a given interval by using experimental data points to constitute and solve a system of n independent linear equations.

22. The method as claimed in claim 18, wherein additional media processing objects are created so that the simulation is conducted at an optimal CPU load level.

23. The method as claimed in claim 22, wherein the creation of additional media processing objects is adjusted dynamically according to the CPU load incurred by the media processing objects that are being calibrated.

24. The method as claimed in claim 22, wherein the feedback from the media Processing media processing cores is normalized as appropriate to the nature of operation of the media processing object that is being calibrated.

* * * * *